(12) United States Patent
He et al.

(10) Patent No.: US 11,265,598 B2
(45) Date of Patent: Mar. 1, 2022

(54) METHOD AND DEVICE FOR DETERMINING DUPLICATE VIDEO

(71) Applicant: BEIJING BYTEDANCE NETWORK TECHNOLOGY CO., LTD., Beijing (CN)

(72) Inventors: Yi He, Beijing (CN); Lei Li, Beijing (CN); Cheng Yang, Beijing (CN); Gen Li, Beijing (CN); Yitan Li, Beijing (CN)

(73) Assignee: SEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/958,513

(22) PCT Filed: Dec. 29, 2018

(86) PCT No.: PCT/CN2018/125500
§ 371 (c)(1),
(2) Date: Jun. 26, 2020

(87) PCT Pub. No.: WO2019/184522
PCT Pub. Date: Oct. 3, 2019

(65) Prior Publication Data
US 2021/0058667 A1     Feb. 25, 2021

(30) Foreign Application Priority Data

Mar. 29, 2018   (CN) .......................... 201810273706.3

(51) Int. Cl.
*H04N 21/44*      (2011.01)
*H04N 21/234*     (2011.01)

(52) U.S. Cl.
CPC . *H04N 21/44008* (2013.01); *H04N 21/23418* (2013.01)

(58) Field of Classification Search
None
See application file for complete search history.

(56) References Cited

U.S. PATENT DOCUMENTS 6,597,738 B1    7/2003  Park et al.
10,296,540 B1 * 5/2019  Bhole .................... G06F 16/51
(Continued)

FOREIGN PATENT DOCUMENTS

CN    104053023 A  *  9/2014
CN    104053023 A     9/2014
(Continued)

OTHER PUBLICATIONS

Suzuki et al.; "Gaussian Sparse Hashing"; IEICE Technical Report; Nov. 2013; p. 155-160 (contains English Abstract).
(Continued)

*Primary Examiner* — Lindsay J Uhl
(74) *Attorney, Agent, or Firm* — BakerHostetler

(57) ABSTRACT

The present invention relates to a method and a device for determining a duplicate video, wherein the method comprises: acquiring multiple types of video features of a query video; according to the multiple types of video features of the query video, sequentially comparing a plurality of existing videos respectively to obtain a sequence comparison result; performing a first ranking on the plurality of existing videos according to the sequence comparison result, and taking first n existing videos as first candidate videos according to a result of the first ranking, where n is a positive integer; and determining a duplication level of the query video according to the sequence comparison result of the first candidate videos.

18 Claims, 9 Drawing Sheets

(56) References Cited

U.S. PATENT DOCUMENTS

2011/0311147 A1* 12/2011 Pahalawatta .......... G06T 7/0002
                                                          382/197
2012/0114167 A1*  5/2012 Tian ................... G06K 9/00744
                                                          382/100
2015/0332124 A1* 11/2015 Yang .................... G06K 9/4609
                                                          382/165

FOREIGN PATENT DOCUMENTS

| CN | 105893405 A | 8/2016 |
| CN | 106034240 A | 10/2016 |
| CN | 106375781 A | 2/2017 |
| CN | 106375850 A | 2/2017 |
| CN | 107665261 A | 2/2018 |
| EP | 1026635 A2 | 8/2000 |
| JP | 2012-226477 A | 11/2012 |
| WO | WO 2018/011870 A1 | 1/2018 |

OTHER PUBLICATIONS

Murai et al.; "Shot Boundary Detection using Global and Local Changes in Video Stream"; IPSJ SIG Technical Report; vol. 2007; Jan. 2007; p. 217-224 (contains English Abstract).
International Patent Application No. PCT/CN2018/125500; Int'l Search Report; dated Mar. 15, 2019; 3 pages.
Singapore Patent Application No. 11201914063R; Search Report and Written Opinion; dated Dec. 20, 2020; 9 pages.

\* cited by examiner

```
┌─────────────────────────────────────────────────────────────┐
│  determining, according to a frame image, a first matrix    │
│  having a first matrix dimension and a second matrix        │
│  dimension; wherein, a point in the first matrix is         │
│  corresponding to a pixel in the frame image and the        │──── S41
│  value of the point in the first matrix is a three-         │
│  dimensional vector which is defined as a first vector      │
│  representing the three color channels of a                 │
│                    corresponding pixel                      │
└─────────────────────────────────────────────────────────────┘
                              │
                              ▼
┌─────────────────────────────────────────────────────────────┐
│  arranging, on the first matrix, a plurality of first       │
│  blocks, the number of which in the first matrix dimension  │
│  is less than the length of the first matrix dimension of   │
│  the first matrix, and the number of which in the second    │
│  matrix dimension is less than the length of the second     │──── S42
│  matrix dimension of the first matrix; for each first       │
│  block, respectively calculating the maximum value, the     │
│  minimum value and the average value of each dimension of   │
│  a plurality of the first vectors contained in the first    │
│  block to obtain a 9-dimensional second vector              │
└─────────────────────────────────────────────────────────────┘
                              │
                              ▼
┌─────────────────────────────────────────────────────────────┐
│  determining, according to the second vectors corresponding │
│  to the plurality of the first blocks, a second matrix, the │
│  points of which are corresponding to the first block and   │──── S43
│  take the value of the second vectors of the corresponding  │
│                         first blocks                        │
└─────────────────────────────────────────────────────────────┘
                              │
                              ▼
┌─────────────────────────────────────────────────────────────┐
│  repeating step S42 and step S43 until the first matrix is  │
│  reduced into a point having a value of a 3^N-dimensional   │──── S44
│  vector, which is determined as a pooling feature of the    │
│                        frame image                          │
└─────────────────────────────────────────────────────────────┘
```

Figure 4 defining a plurality of straight lines with the slope of a preset slope set value in the similarity matrix as candidate straight lines, and determining the straight line similarity of the candidate straight lines according to the each unit similarities contained in each candidate straight line — S64-1a determining a candidate straight line enabling the straight line to have the maximum similarity from the plurality of candidate straight lines, and defining the candidate straight line as a first matching straight line — S64-1b determining the straight line similarity of the first matching straight line as the sequence comparison score — S64-1c

Figure 7 selecting a plurality of points with the maximum unit similarities from the similarity matrix as extreme points of similarity — S64-2a fitting a straight line as a second matching straight line in the similarity matrix on the basis of the plurality of extreme points of similarity — S64-2b determining a sequence comparison score according to the plurality of unit similarities contained in the second matching straight line — S64-2c

Figure 8

METHOD AND DEVICE FOR DETERMINING DUPLICATE VIDEO

CROSS-REFERENCE TO RELATED APPLICATION

The disclosure is the national phase application of International Patent Application No. PCT/CN2018/125500, titled "METHOD AND DEVICE FOR DETERMINING DUPLICATE VIDEO", filed on Dec. 29, 2018, which claims priority to Chinese Patent Application No. 201810273706.3, filed on Mar. 29, 2018, the entire contents of both of which are incorporated herein by reference.

TECHNICAL FIELD

The present invention relates to the technical field of video processing, in particular to a method and a device for determining a duplicate video.

BACKGROUND ART

In today's multimedia information society, users upload massive videos to the video platform every day. Most of the videos are normal valuable videos, however, there are also some problematic videos including videos that have been duplicate with existing videos in the platform video database, videos that are duplicate with videos in the copyrights database (e.g., videos that require payment of a royalty fee), and some videos that are unsuitable or prohibited for presentation. Therefore, mass videos uploaded by users need to be quickly compared and de-duplicated.

The existing video comparison and de-duplication methods have the problems of low speed, poor accuracy, large consumption of operation resources and storage resources and the like.

SUMMARY OF THE INVENTION

The object of the present disclosure is to provide a new method and device for determining duplicate video.

The object of the present disclosure is also realized by adopting the following technical scheme. A method for determining duplicate video according to the present disclosure, comprising: acquiring multiple types of video features of a query video; according to the multiple types of video features of the query video, sequentially comparing a plurality of existing videos respectively to obtain a sequence comparison result; performing a first ranking on the plurality of existing videos according to the sequence comparison result, and taking first n existing videos as first candidate videos according to a result of the first ranking, where n is a positive integer; and determining a duplication level of the query video according to the sequence comparison result of the first candidate videos.

The object of the present disclosure is further realized by adopting the following technical scheme.

The foregoing method for determining duplicate video, wherein the process of acquiring multiple types of video features of a query video comprises: extracting frames of the query video to obtain a plurality of frame images of the query video; extracting multiple types of image features of each of the plurality of frame images as first image features; and according to each of the first image features with an identical type of the plurality of frame images of the query video, determining each video feature of the query video as a first video feature to obtain multiple types of first video features.

The foregoing method for determining duplicate video, wherein the process of extracting multiple types of image features of each of the plurality of frame images comprises: for each of the plurality of frame images, acquiring one or more shift vectors, determining an end point pointed by the shift vector by using each of the one or more shift vectors and taking any pixel in each of the plurality of frame images as a starting point; and determining the multiple types of image features of the plurality of frame images as a fence feature according to an overall condition of differences between each starting point and each corresponding end point.

The foregoing method for determining duplicate video, wherein the process of extracting multiple types of image features of each of the plurality of frame images comprises: for each of the plurality of frame images, performing multiple types of pooling processes step by step to obtain the multiple types of image features of the plurality of frame images as a pooling feature, wherein the multiple types of pooling processes comprise a maximum pooling process, a minimum pooling process and an average pooling process.

The foregoing method for determining duplicate video, wherein the process of according to the multiple types of video features of the query video, sequentially comparing a plurality of existing videos respectively to obtain a sequence comparison result comprises: acquiring multiple types of video features of one of the plurality of existing videos as second video features, wherein each of the second video features comprises a plurality of second image features; determining a unit similarity between each of the second image features and each of the first image features of the same type respectively to obtain multiple types of unit similarities; determining a minimum value or an average value of the multiple types of unit similarities, and determining a similarity matrix of the plurality of existing videos according to the minimum value or the average value of the multiple types of unit similarities; and determining a sequence comparison score according to the similarity matrix, wherein the sequence comparison score is configured for indicating a similarity of the plurality of existing videos and the query video.

The foregoing method for determining duplicate video, wherein the process of determining a sequence comparison score according to the similarity matrix comprises: determining the sequence comparison score according to a straight line in the similarity matrix.

The foregoing method for determining duplicate video, wherein the process of according to the multiple types of video features of the query video, sequentially comparing a plurality of existing videos respectively to obtain a sequence comparison result further comprises: determining a duplicate video segment of the plurality of existing videos and the query video according to the similarity matrix.

The foregoing method for determining duplicate video, wherein the process of according to the multiple types of video features of the query video, sequentially comparing a plurality of existing videos respectively to obtain a sequence comparison result comprises: performing a second ranking on the plurality of existing videos according to each of the first image features in at least one of the multiple types of first video features, according to a result of the second ranking, taking first k of the plurality of existing videos as second candidate videos, where k is a positive integer; and performing a sequence comparison on each of the second candidate videos respectively to obtain the sequence comparison result. The foregoing method for determining duplicate video, wherein the process of performing a second ranking on the plurality of existing videos according to each of the first image features in at least one of the multiple types of first video features comprises: using each of the first image features in at least one of the multiple types of first video features as an index request to perform a term frequency-inverse document frequency ranking on the plurality of existing videos.

The foregoing method for determining duplicate video, wherein the process of according to each of the first image features with an identical type of the plurality of frame images of the query video, determining each video feature of the query video as a first video feature comprises: binarizing the first image features; and determining the first video feature according to binarized first image features of the plurality of frame images.

The object of the present disclosure is also realized by adopting the following technical scheme. A device for determining duplicate video according to the present disclosure, comprising: a video feature acquisition module configured to acquire multiple types of video features of a query video; a sequence comparison module configured to perform, according to the multiple types of video features of the query video, sequence comparison on a plurality of existing videos respectively to obtain a sequence comparison result; a first ranking module configured to perform a first ranking on the plurality of existing videos according to the sequence comparison result, and take the first n existing videos as first candidate videos according to the result of the first ranking, wherein n is a positive integer; and a duplicate checking module configured to determine the duplication level of the query video according to the sequence comparison result of the first candidate videos.

The foregoing device for determining duplicate video, further comprising the module configured to perform the any of the foregoing method.

The object of the present disclosure is also realized by adopting the following technical scheme. A hardware device for determining duplicate video according to the present disclosure, comprising: a memory, configured to store non-transitory computer-readable instructions; a processor, configured to perform any of the foregoing methods for determining duplicate video when the computer-readable instructions are executed by the processor.

The object of the present disclosure is also realized by adopting the following technical scheme. A computer-readable storage medium, storing non-transitory computer-readable instructions to perform any of the foregoing method for determining duplicate video when the non-transitory computer-readable instructions are executed by a computer.

The object of the present disclosure is also realized by adopting the following technical scheme. A terminal device, comprising any of the foregoing device for determining duplicate video.

The above description is only an overview of the technical scheme of the present disclosure. In order to have a better understanding of the technical scheme of the present disclosure and implement it in accordance with the contents of the description, and to make the above and other purposes, features and advantages of the present disclosure more obvious and understandable, the following is a preferred embodiment, and is described in detail with the accompanying drawings.

BRIEF DESCRIPTION OF THE DRAWINGS

FIG. 4 is a block flow diagram for extracting a pooling feature provided by one embodiment of the present disclosure.

FIG. 7 is a block flow diagram of sequence comparison using dynamic programming provided by one embodiment of the present disclosure.

FIG. 8 is a block flow diagram of sequence comparison using a constant-speed video method provided by one embodiment of the present disclosure.

DETAILED DESCRIPTION OF THE INVENTION

In order to further illustrate the technical means and effects adopted by the present disclosure in the purpose of achieving the intended purposes of the present invention, the detailed description, structure, features and efficacy of the method and device for determining duplicate video according to the present disclosure are as follows in combination with the accompanying drawings and preferred embodiments.

Figure 1:
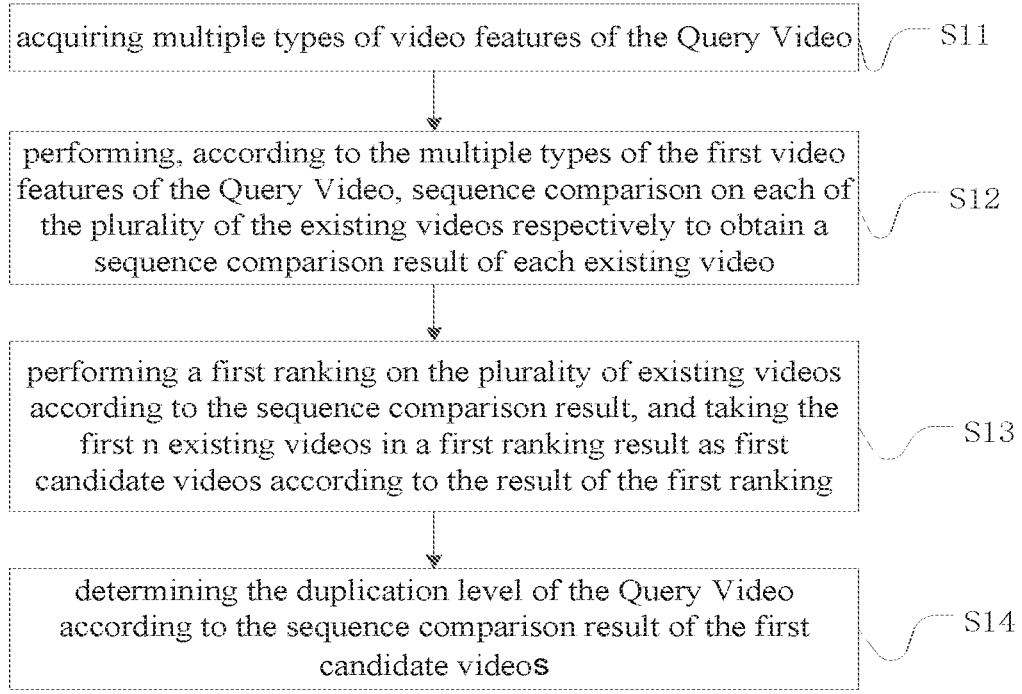
FIG. 1 is a flow diagram of a method for determining duplicate videos according to one embodiment of the present disclosure.

FIG. 1 is a schematic flow diagram of one embodiment of the method for determining a duplicate video of the present disclosure. Referring to FIG. 1, the method for determining a duplicate video in the example of the present disclosure mainly comprises the following steps:

Step S11, acquiring multiple types of video features of the video to be duplicate-checked (Query Video). The video can be either a video signal or a video file. The video feature of the query video may be defined as a first video feature. Thereafter, the process proceeds to step S12. acquiring multiple types of video features of the query video Step S12, performing, according to the multiple types of the first video features of the query video, sequence comparison on each of the plurality of the existing videos respectively to obtain a sequence comparison result of each existing video. In some examples, the sequence comparison result includes a sequence comparison score for representing a degree of similarity of the existing video to the query video and/or duplicate video segments of the existing video to the query video. In some embodiments, the existing video is a video in a video database. Thereafter, the process proceeds to step S13.

Step S13, performing a first ranking on the plurality of existing videos according to the sequence comparison result, and taking the first n existing videos in a first ranking result as first candidate videos according to the result of the first ranking, wherein n is a positive integer. Thereafter, the process proceeds to step S14.

Step S14, determining the duplication level of the query video according to the sequence comparison result of the first candidate videos. For example, it is determined whether the query video is a duplicate video (which may be determined by manual comparison, or by presetting a threshold value for the sequence comparison score and determining on the basis of whether the sequence comparison score of the first candidate video is above the threshold value), which one or more existing videos it is duplicate with, or which particular video segments are duplicate, and then filter the duplicate video.

The method for determining a duplicate video provided by the present disclosure is used for carrying out video duplicate checking wherein multiple types of video features are exploited, which can greatly improve the accuracy and the efficiency for determination of duplicate videos. The steps described above are set forth and described in detail below, respectively.

I, with Respect to Step S11.

Figure 2:
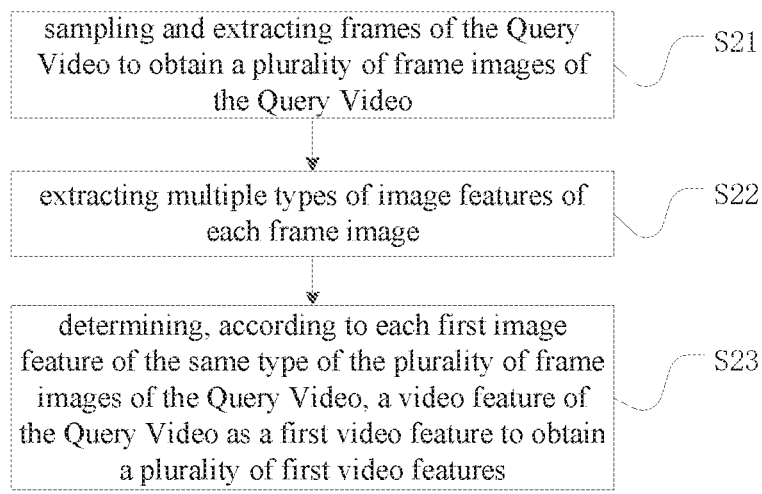
FIG. 2 is a block flow diagram for acquiring a video feature of a query video provided by one embodiment of the present disclosure.

FIG. 2 is a block flow diagram for acquiring a video feature of a query video provided by one embodiment of the present disclosure. Referring to FIG. 2, in one embodiment of the present disclosure, step S11 of the present disclosure includes the following steps:

step S21, sampling and extracting frames of the query video to obtain a plurality of frame images of the query video. In fact, the plurality of frame images constitutes a sequence of images. In particular, the specific number of frame images extracted can be set up. For example, two frame images may be extracted from the video per second or one frame image may be extracted from the video per second. Note that the frames can be extracted evenly, i.e. the time intervals between every two adjacent frame images are uniform.

Step S22, extracting multiple types of image features of each frame image, wherein the image features of the query video may be defined as a first image feature.

Step S23, determining, according to each first image feature of the same type of the plurality of frame images of the query video, a video feature of the query video as a first video feature to obtain a plurality of first video features. Specifically, the plurality of first image features may be arranged in the order of the corresponding plurality of frame images in the video (i.e., the order in the sequence of images), resulting in the first video features.

The method of extracting the image feature and the type of the obtained first image feature in step S22 are not limited, and the extraction of the first image feature can be performed in various ways. For example, the extracted first image feature may be a floating-point number feature or a binarized feature. It should be noted that a video feature of an existing video is recorded in a video database (a video feature of an existing video can be defined as a second video feature, and the second video feature are composed of a plurality of second image features), and the video database contains a second video feature of the same type extracted by the same method as the first video feature, enabling that the comparison of the first video feature with the second video feature of the same type can be performed in the video feature comparison process.

Notably, the video feature of the existing video can be obtained as described above. For the convenience of distinction, a video feature of an existing video may be defined as a second video feature, and an image feature in the second video feature may be defined as a second image feature.

In some embodiments of the present disclosure, a fence feature (also referred to as a Fence feature or Recall feature) is included among the plurality of image features extracted in step S22. The method for extracting the fence feature of the frame image comprises the following steps: for each frame image, acquiring one or more shift vectors, determining an end point pointed by the shift vector by using each of the shift vector and taking any pixel in one frame image as a starting point, determining the difference between each pair of starting point and the end point, determining the image feature of the frame image according to the overall condition of the difference of each pair of starting point and the end point, and defining the image feature as a fence feature. It should be noted that so-called taking any pixel as a starting point means: in general, all pixels in a frame image can be defined as a starting point; alternatively, the pixels of one or more preset positions in the frame image may be defined as a starting point, and the specific positions may be arbitrary. For example, all points not on the edge in a frame image may be taken as starting points.

Figure 3:
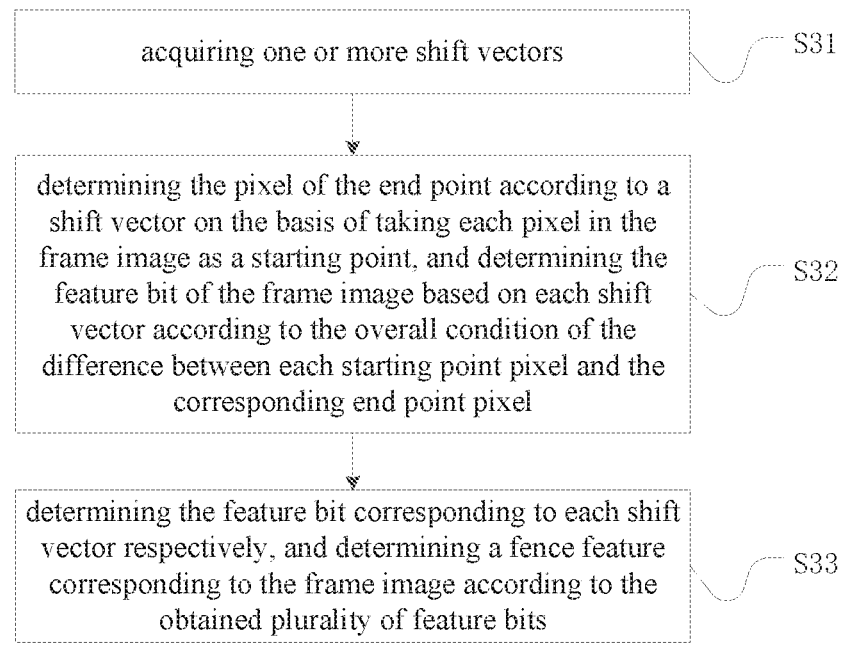
FIG. 3 is a block flow diagram for extracting a fence feature provided by one embodiment of the present disclosure.

In particular, FIG. 3 is a block flow diagram for extracting a fence feature provided by one embodiment of the present disclosure. Since image features can be acquired according to the method shown in FIG. 3 for any video, it is not distinguished in the description of this embodiment whether it is a query video. Referring to FIG. 3, in one embodiment of the present disclosure, step S22 in an example of the present disclosure may include the following steps:

Step S31, acquiring one or more shift vectors. It may be assumed that the number of acquired shift vectors is N, where N is a positive integer. In particular, the plurality of shift vectors may be preset or randomly generated. Further, the length and direction of each shift vector are arbitrary. In addition, the all shift vectors are mutually independent and have no correlation. It is to be noted that, for a plurality of frame images obtained by extracting frames, it is generally possible to determine the image feature of each frame image using the same set of shift vectors, but it is also possible to determine the image feature of each frame image using different sets of shift vectors separately. Thereafter, the process proceeds to step S32.

Step S32, determining the pixel of the end point according to a shift vector on the basis of taking each pixel in the frame image as a starting point, and determining the feature bit of the frame image based on each shift vector according to the overall condition of the difference between each starting point pixel and the corresponding end point pixel. Thereafter, the process proceeds to step S33.

Step S33, determining the feature bit corresponding to each shift vector respectively, and determining a fence feature corresponding to the frame image according to the obtained N feature bits.

In some examples, the differences between the starting point pixel and the end point pixel includes a difference between luminance information of the starting point pixel and luminance information of the end point pixel. Specifically, in one example, step S32 includes: allocating a counter to a shift vector; counting the luminance difference between each pair of the starting point and the end point, increasing and decreasing the value of the counter where the value of the counter is increased by 1 if the luminance value of the starting point is larger than the luminance value of the end point, otherwise, the value of the counter is decreased by 1 if the luminance value of the starting point is smaller than the luminance value of the end point; determining whether the value of the counter is larger than a preset set value (for example, the set value can be preset to be 0), if the value of the counter is larger than the set value, generating a feature bit with a value of 1, otherwise, generating a feature bit with a value of 0.

It is to be noted that if the end point of the shift vector exceeds the range of the frame image, the value of the counter may not be changed, or the frame image may be extended periodically, and the same frame image as the frame image is arranged on all sides of the frame image so that there must be a corresponding pixel at the end point of the shift vector.

Through determining a starting point pixel and an end point pixel in a frame image according to a shift vector with arbitrary length and direction, and generating the feature of the frame image by comparison of the differences between the starting point pixel and the end point pixel, the accuracy and efficiency of the video feature extraction and the quality of the obtained video feature can be improved, further enabling that the duplicate video checking on the basis of fence feature has higher accuracy and efficiency.

In some embodiments of the present disclosure, a pooling feature (which may also be referred to as a Pooling feature or a Reranking feature) is included among the plurality of image features extracted in step S22. The method for extracting the pooling feature of the frame image comprises the following steps: for each frame image, performing multiple types of pooling processes step by step to obtain an image feature of the frame image which is being defined as a pooling feature. Pooling is a dimensionality reduction method in the field of convolution neural networks, and so-called multiple types of pooling include maximum pooling, minimum pooling and average pooling. In particular, multiple types of pooling may be performed step by step on the basis of multiple color channels of the frame image to obtain an image feature from the multiple color channels of the frame image.

Specifically, performing multiple types of pooling on a frame image step by step includes the following steps: determining a matrix from the frame image, and making use of multiple types of pooling to generate a smaller matrix step by step until it being reduced to a matrix that includes only one point (alternatively, a "point" in the matrix may also be referred to as an "element" in the matrix), from which the pooling feature of the frame image is determined. FIG. 4 is a schematic block diagram for extracting a pooling feature provided by one embodiment of the present disclosure. Since the image feature can be acquired according to the method shown in FIG. 4 for any video, it is not distinguished in the description of this embodiment whether it is a query video or not. Referring to FIG. 4, in one embodiment of the present disclosure, step S22 in an example of the present disclosure may include the following steps:

Step S41, determining a first matrix having a first matrix dimension and a second matrix dimension (or having a length direction and a width direction) according to a frame image. It may be assumed that the frame image has a length of x pixels and a width of y pixels, where x and y are positive integers. A point in the first matrix (a point in the matrix may also be referred to as an element in the matrix, but in order to distinguish it from an element in the vector, the element in the matrix is hereinafter referred to as a "point") corresponds to a pixel in the frame image, such that the first matrix is such a matrix where the first matrix dimension has a length of x and the second matrix dimension has a length of y (i.e. an x*y matrix); as used herein, the length of the first matrix dimension/second matrix dimension of the matrix is used to represent the number of points that the matrix contains in the first matrix dimension/second matrix dimension. The value of each point in the first matrix is a three-dimensional vector which is defined as a first vector, and the first vector is used for representing the luminance of three color channels of a corresponding pixel in the frame image. It is to be noted that when the color mode of the video object is a red-green-blue mode (RGB mode), three color channels of red, green and blue can be taken; however, it is not necessary to take the three color channels of red, green and blue. For example, a selection can be made according to the color mode used by the video object; even the number of selected color channels is not necessarily three. For example, two of the three red, green and blue color channels may be selected. Thereafter, the process proceeds to step S42.

Step S42, arranging a plurality of first blocks on the first matrix (in fact, each block is equivalent to a pooling window, and therefore the first block can also be referred to as a first pooling window), or arranging $x_1*y_1$ first blocks, wherein $x_1$ and $y_1$ are positive integers, and each first block comprises a plurality of points (or comprises a plurality of first vectors) of the first matrix; the number of the first blocks in a first matrix dimension is less than the length of the first matrix dimension of the first matrix (or, less than the number of points the first matrix includes in the first matrix dimension), and the number of the plurality of first blocks in the second matrix dimension is less than the length of the second matrix dimension of the first matrix (or less than the number of points the first matrix contains in the second matrix dimension), i.e., $x_1$ has a value less than x and $y_1$ has a value less than y. For each first block, respectively calculating the maximum value, the minimum value and the average value of each dimension of a plurality of first vectors contained in the first block to obtain a 9-dimensional vector corresponding to the first block, and defining the 9-dimensional vector as a second vector. It should be noted that the respective first blocks may partially overlap each other, i.e. comprising the same points, or may not partially overlap each other. Thereafter, the process proceeds to step S43.

In particular, when arranging the first block a first matrix dimension of a first matrix can be evenly divided into $x_1$ sections, each of which has the same length, and two adjacent sections comprise the same points (partially overlaps), and a second matrix dimension of the first matrix is divided into $y_1$ sections in the same manner, and then $X_1*y_1$ first blocks of the first matrix are obtained by combining the $x_1$ sections with the $y_1$ sections.

It should be noted that when each first block is arranged to have the same size and the same pitch (adjacent two first blocks may overlap), the process of arranging a plurality of first blocks on the first matrix and calculating the second vector for each first block is virtually identical to scanning (or scribing) the entire first matrix at a pitch with a pooling window and calculating the second vector of the area covered by the pooling window in each scan.

Step S43, determining a second matrix according to the plurality of $x_1*y_1$ first blocks and the second vector corresponding to each first block; a point in the second matrix corresponds to a first block, and when $x_1*y_1$ first blocks are set, the second matrix is a matrix with the length of the first matrix dimension being $x_1$ and the length of the second matrix dimension being $y_1$ (i.e. an $x_1*y_1$ matrix); the value of each point in the second matrix is the second vector of the corresponding first block. Thereafter, the process proceeds to step S44.

It should be noted that in determining the second matrix, the correspondence of the first block to the point in the second matrix needs to be performed in a certain order. As a specific example, each point in the second matrix may be arranged in order of the position of each first block in the first matrix.

Step S44, repeating step S42 and step S43: obtaining a third matrix comprising $x_2*y_2$ points each of which has a value of a 27-dimensional vector according to the second matrix comprising $x_1*y_1$ points each of which has a value of a 9-dimensional vector (wherein $x_2$ is a positive integer smaller than $x_1$ and $y_2$ is a positive integer smaller than $y_1$); then obtaining a forth matrix comprising $x_3*y_3$ points each of which has a value of a 81-dimensional vector according to the third matrix comprising $x_2*y_2$ points each of which has a value of a 27-dimensional vector (wherein $x_3$ is a positive integer smaller than $x_2$ and $y_3$ is a positive integer smaller than $y_2$); . . . ; until the first matrix (or the frame image) is reduced into an Nth matrix of 1*1 (in fact, the matrix is reduced into one point), wherein N is a positive integer, and the Nth matrix only comprises one point, the value of which is a vector of $3^N$ dimensions; and determining the $3^N$-dimensional vector as the pooling feature of the frame image.

It should be noted that in the process of setting block every time in step S44, the block should be set in a corresponding manner according to the size of the matrix to accommodate the gradual reduction of the first matrix dimension and the second matrix dimension of the matrix.

Through performing multiple types of pooling on the frame image step by step to generate the feature of the frame image, the accuracy and the efficiency of the video feature extraction can be improved, and the quality and the robustness of the obtained video feature can be improved, so that the duplicate video checking on the basis of the pooling feature has higher accuracy and efficiency.

Further, in embodiments of the present disclosure, if the image feature determined in step S22 is not a bit string of binary numbers (e.g., the pooling feature is a floating point number feature), the present disclosure may further include the following steps: the image feature determined in step S22 is binarized to obtain a binarized image feature, which is a bit string composed of 0/1, and then the video feature of the video object is determined according to the obtained binarized image feature.

Figure 5:
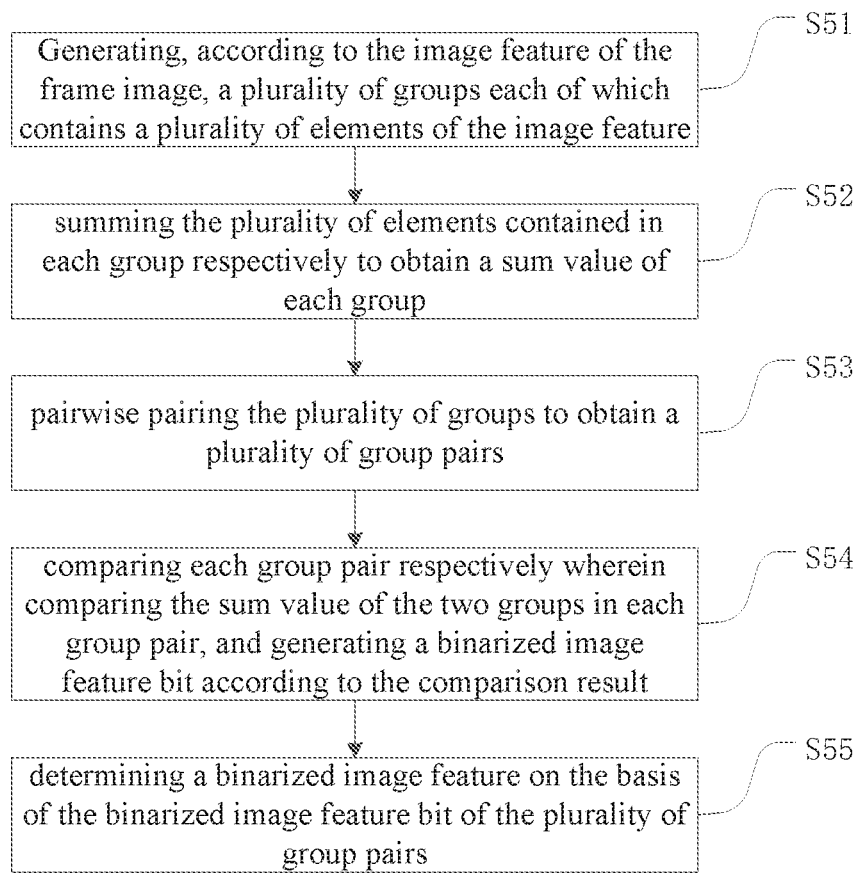
FIG. 5 is a block flow diagram of binarization on image feature using a random projection method provided by one embodiment of the present disclosure.

The storage of the video feature can be compressed, and the similarity calculation process of video comparison is accelerated through binarizing the image feature, In particular, random projection methods may be used to convert image feature into image feature in binarized form. Since the first image feature of the query video and the second image feature of the existing video can be binarized in the same way, in this example, the first image feature and the second image feature are not distinguished. FIG. 5 provides a schematic block diagram of binarizing the image feature using random projection method in accordance with one embodiment of the present disclosure. Referring to FIG. 5, the method for determining a duplicate video according to an example of the present disclosure may further comprise the following steps of performing binarization processing on an image feature using a random projection method:

Step S51, in order to generate a binarized image feature of length h, 2h groups, each of which contains a plurality of elements of the image feature (i.e., each group contains values of a plurality of dimensions of the image feature) are generated according to one image feature. H is a positive integer. Thereafter, the process proceeds to step S52.

It should be noted that the elements specifically contained in the group are arbitrary, and that two different groups may include some of the same elements. However, in order to facilitate video comparison, the elements contained in each group may be preset, or the group may be generated in the same manner for multiple videos.

In this example, each group contains the same number of elements. It should be noted, however, that in fact the number of elements contained in each group may vary.

Step S52, summing the plurality of elements contained in each group respectively to obtain a sum value of each group. Thereafter, the process proceeds to step S53.

Step S53, pairwise pairing the 2h groups to obtain h group pairs. Thereafter, the process proceeds to step S54.

Specifically, 2h groups may be numbered (or the groups may be ordered) in advance and two adjacent groups may be paired.

Step S54, comparing each group pair respectively wherein comparing the sum value of the two groups in each group pair, and generating a binarized image feature bit according to the comparison result. Thereafter, the process proceeds to step S55.

Specifically, in the example in which the groups have been previously numbered, if the sum value of the group with a small number is greater than the sum value of the group with a large number in a pair of the groups, a binarized image feature bit having a value of 1 is generated, otherwise a binarized image feature bit having a value of 0 is generated. It should be noted that the manner in which the binarized image feature bit is generated is not limited. For example, the binarized image feature bit having a value of 1 may also be generated when the sum value of the group with the small number is smaller than the sum value of the group with the large number.

Step S55, forming a binarized image feature with the length of h according to the h binarized image feature bits of the h group pairs.

II. Regarding Step S12 and Step S13.

Figure 6:
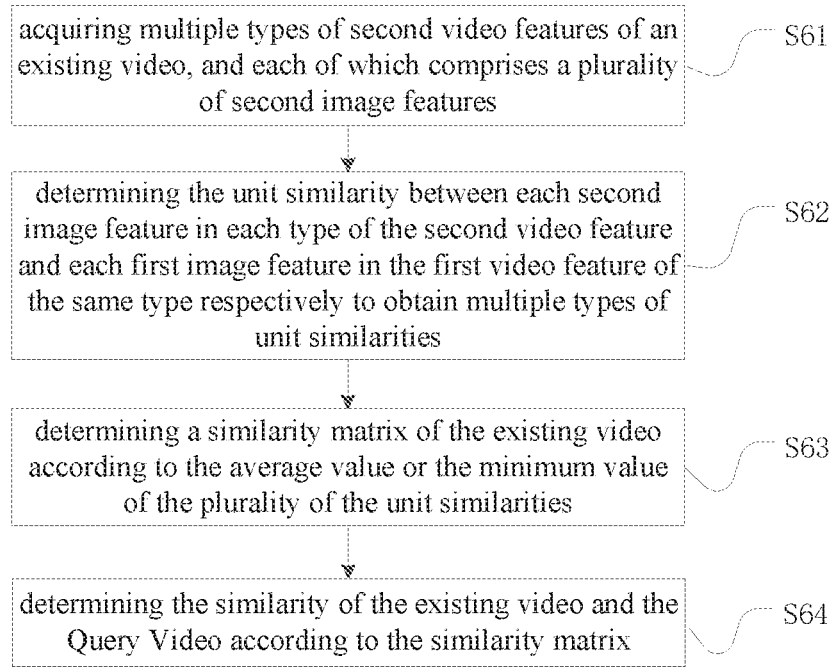
FIG. 6 is a block flow diagram of sequence comparison provided by one embodiment of the present disclosure.

FIG. 6 is a schematic block flow diagram of a sequence comparison provided by one embodiment of the present disclosure.

Referring to FIG. 6, step S12 in the disclosed example may include the following steps:

Step S61, acquiring multiple types of video features of an existing video. A video feature of an existing video may be defined as a second video feature, each of which comprises a plurality of second image features. Thereafter, the process proceeds to step S62.

For example, the fence feature and pooling feature of the query video and the existing video may be acquired simultaneously, and/or the floating point number feature and binarized feature may be acquired simultaneously.

Step S62, aiming at a plurality of second video features and a plurality of first video features, respectively determining the unit similarity between each second image feature in each type of the second video feature and each first image feature in the first video feature of the same type to obtain multiple types of unit similarities. Each unit similarity is used to indicate a degree of similarity between a first image feature and a second image feature, and in particular, a greater unit similarity indicates a greater similarity. Thereafter, the process proceeds to step S63.

It may be assumed that the length of the first video feature of the query video and the length of the second video feature of the existing video are $M_1$ and $M_2$, respectively, where $M_1$ and $M_2$ are positive integers, that is, the first video feature includes $M_1$ first image features and the second video feature includes $M_2$ second image features. Therefore, $M_1*M_2$ unit similarities can be obtained between the first video feature and the second video feature of the same type.

In an embodiment of the present disclosure, a distance or metric capable of determining the degree of similarity of the first and second image features may be selected as the unit similarity according to the type of the image feature.

Specifically, when the first image feature and the second image feature are both floating point number features, the unit similarity can be determined according to the cosine distance (or cosine similarity) between the first image feature and the second image; the cosine distance can generally be determined directly as the unit similarity. And when the first image feature and the second image feature are both binarized features, the unit similarity can be determined according to the Hamming distance between the first image feature and the second image feature. Specifically, the Hamming distance between the first image feature and the second image feature is calculated firstly, then the difference value between the length of the image feature and the Hamming distance is calculated, and the ratio of the difference value to the length of the image feature is determined to be the unit similarity which represents the proportion of identical bits in the binarized first image feature and the binarized second image feature. The Hamming distance is a common measurement in the field of information theory, and the Hamming distance between two equal-length character strings is the number of different characters at corresponding positions of the two character strings. It should be noted that image features extracted using the same method generally have the same length.

It should be noted that the unit similarity is not limited to be represented by cosine distance or Hamming distance, but any distance or metric that can determine the degree of similarity of two image features can be used.

Step S63, in one example, determining an average value of a plurality of unit similarities, and determining a similarity matrix of the existing video according to an average value of the plurality of unit similarities; or in another example, a minimum value of a plurality of unit similarities is determined, and a similarity matrix of the existing video is determined according to the minimum value of the plurality of unit similarities.

Specifically, each point in the similarity matrix corresponds to a unit similarity such that the similarity matrix records unit similarities between each second image feature and each first image feature of an existing video. Each point of the similarity matrix is arranged according to the sequence of the first image features of the query video in the first video feature in the transverse direction, and arranged according to the sequence of the second image features of the existing video in the second video features in the longitudinal direction. Therefore, the point located at the ith row and the jth column represents the unit similarity between the ith frame of the query video and the jth frame of the existing video respectively, and the similarity matrix is an $M_1 \times M_2$ matrix. Thereafter, the process proceeds to step S64.

It should be noted that before taking the average or minimum value of the various unit similarities, it is necessary to ensure that the various unit similarities have a uniform value range. For example, the value range of all types of unit similarities can be set to 0 to 1 in advance. In fact, the examples of the unit similarity determined according to the cosine distance and the examples of the unit similarity determined according to the Hamming distance have both set the value range of the unit similarity to 0 to 1.

It should be noted that in actual operation, it is not necessary to first calculate each unit similarity in step S62 and then determine the similarity matrix in step S63, but the similarity matrix can be directly determined, and the corresponding unit similarity is calculated in the process of determining each point of the similarity matrix.

Step S64, determining the similarity of the existing videos and the query video according to the similarity matrix. Specifically, the so-called determining the similarity includes determining a degree of similarity between the existing videos and the query video on the basis of the similarity matrix, and the degree of similarity can be represented by the sequence comparison score. In embodiments of the present disclosure, the sequence comparison score may be a score between 0 and 1, with the larger number indicating that two videos are more similar. Further, determining the similarity further includes determining starting and ending times of the duplicate video segments in the existing video and the query video on the basis of the similarity matrix.

In some embodiments of the present disclosure, step S64 comprises: determining the similarity between the query video and the existing video according to a straight line in the similarity matrix.

Note that since video features typically contain a finite number of image features, and thus the similarity matrix is a finite matrix, what is actually called a "straight line" is a finite length of line segment made up of a number of points in the similarity matrix. The line has a slope that is a slope of a line connecting a plurality of points included in the line. In addition, the starting and ending points of the line may be any point in the similarity matrix and are not necessarily a point at the edge.

The straight line of the present disclosure includes a diagonal line in the similarity matrix, lines of each line segment parallel to the diagonal line having a slope of 1 from top left to bottom right in the similarity matrix, and lines having a slope other than 1. For example, it may be a straight line with a slope of approximately 1 to improve the robustness of the duplicate check; it may be a straight line with a slope of 2, 3, . . . or ½, ⅓, . . . or the like, so as to cope with the duplicate check of the speed-regulated video; it may even be a line with a negative slope (line from bottom left to top right in the similarity matrix) to cope with the video subjected to the reverse playback process. The diagonal line is a line segment (in fact, a line starting at the point of the upper left corner and having a slope of 1) composed of points located at (1, 1), (2, 2), (3, 3) . . . .

In fact, each straight line in the similarity matrix is composed of a plurality of unit similarities which are arranged in sequence, so that the similarity of a query video segment and an existing video segment can be shown since each straight line shows the similarity of a plurality of image feature pairs which are arranged in sequence. Each image feature pair includes a first image feature and a second image feature. That is, each line represents a degree of similarity between a plurality of sequentially arranged first image features and a plurality of sequentially arranged second image features. The slope of the line and the starting and ending points represent the length and position of the two video segments. For example, since a straight line composed of (1, 1), (2, 3), (3, 5), (4, 7) shows similarity between the first image feature with ordinal number 1 and the second image feature with ordinal number 1, similarity between the first image feature with ordinal number 2 and the second image feature with ordinal number 3, . . . , therefore, the straight line can reflect the similarity between the segment of the query video corresponding to the first image features with the ordinal numbers of 1, 2, 3 and 4 and the segment of the existing video corresponding to the second image features with the ordinal numbers of 1, 3, 5 and 7.

Therefore, the similarity of two videos can be determined from the line in the similarity matrix by: defining the average condition (or overall condition) of each unit similarity contained in the straight line as the straight line similarity of the straight line, wherein the straight line similarity can reflect the similarity between a plurality of corresponding first image features and a plurality of corresponding second image features; determining a straight line with the highest straight line similarity in the similarity matrix, which may be called as a matching straight line; determining the straight line similarity of the matching straight line as the similarity between the query video and the existing video, and/or determining a duplicate video segment of the query video and the existing video according to a plurality of first image features and a plurality of second image features corresponding to the matching straight line.

The specific method for determining the duplicate video segment according to the straight line (e.g., the matching straight line) in the similarity matrix can be as follows: determining the starting time of the duplicate video segment in the query video according to the ordinal number (or abscissa in the similarity matrix) of the first image feature corresponding to the starting point of the straight line, and determining the starting time of the duplicate video segment in the existing video according to the ordinal number (or ordinate in the similarity matrix) of the second image feature corresponding to the starting point; similarly, the ending time of the duplicate video segment in the query video is determined according to the abscissa of the end point of the straight line, and the ending time of the duplicate video segment in the existing video is determined according to the ordinate of the end point.

It should be noted that in the process of determining the matching straight line, the straight line with the highest straight line similarity can be determined from a plurality of preset straight lines. For example, the plurality of preset straight lines are all straight lines with the slope being a preset slope set value (such as the slope being 1), or, a plurality of points which enable the unit similarity to rank ahead can be selected from a similarity matrix firstly and then a straight line can be fitted, according to the points, to generate a straight line with the relatively highest line similarity.

In one particular embodiment of the present disclosure, dynamic programming method may be utilized to determine the similarity of two videos on the basis of a similarity matrix. FIG. 7 is a schematic block flow diagram of video duplicate checking using dynamic programming method provided by one embodiment of the present disclosure.

Referring to FIG. 7, in one embodiment, step S64 of the present disclosure includes the following specific steps:

Step S64-1a, defining a plurality of straight lines with the slope of a preset slope set value in the similarity matrix as candidate straight lines, and determining the straight line similarity of the candidate straight lines according to each unit similarity contained in each candidate straight line. Specifically, the straight line similarity of a straight line may be set as an average value of unit similarities contained in the straight line, or may be set as a sum value of unit similarities contained in the straight line. In a specific example, the set value for the slope can be taken as 1, i.e. the candidate straight lines are: the diagonal line and lines parallel to it in the similarity matrix. Thereafter, the process proceeds to step S64-1b.

It should be noted that in one embodiment of the present disclosure, step S64-1a further comprises: those lines containing a number of unit similarities less than a preset set value of the length for the straight line are excluded from the candidate straight lines, and then it is proceeded to step S64-1b. In other words, in the present embodiment, the candidate straight line must also satisfy: the number of unit similarities contained reaches the preset set value of the length for the straight line. By excluding the straight lines with insufficient unit similarities, the problem that the accuracy of the finally obtained sequence comparison result is influenced when the straight line contains insufficient unit similarities can be eliminated.

Step S64-1b, determining a candidate straight line enabling the straight line to have the maximum similarity from the plurality of candidate straight lines, and defining the candidate straight line as a first matching straight line. Thereafter, the process proceeds to step S64-c.

Step S64-1c, determining the straight line similarity of the first matching straight line as the sequence comparison score for representing the similarity between the query video and the existing video; and determining starting and ending times of the duplicate segments in the two videos according to the starting point and the end point of the first matching straight line.

It should be noted that in some embodiments of the present disclosure, the preset set values for the slope in step S64-1a may be multiple, i.e., the candidate straight line is a straight line having a slope equal to any of the multiple set values for the slope, for example, the candidate straight line may be a straight line having a slope of 1, −1, 2, ½, etc. In step S64-1b, a first matching straight line is determined from a plurality of candidate straight lines having a slope at any one of the multiple set values for the slope.

According to the method for determining a duplicate video provided by the invention, the sequence comparison score and/or the duplicate video segments are determined by utilizing the dynamic programming method, so that the accuracy of duplicate checking and the speed of duplicate checking can be improved.

In another embodiment of the present disclosure, a constant-speed video method may also be used to determine the similarity of two videos on the basis of the similarity matrix. FIG. 8 is a schematic block flow diagram of video duplicate checking using the constant-speed video method provided by one embodiment of the present disclosure. Referring to FIG. 8, in one embodiment, step S64 of the present disclosure includes the following specific steps:

Step S64-2a, selecting a plurality of points with the maximum unit similarities from the similarity matrix as extreme points of similarity. The specific number of the extreme points of similarity may be preset. Thereafter, the process proceeds to step S64-2b.

Step S64-2b, fitting a straight line as a second matching straight line in the similarity matrix on the basis of the plurality of extreme points of similarity. In some embodiments, a line having a preset set value for the slope or near the preset set value for the slope is fitted as a second matching straight line on the basis of the plurality of extreme points of similarity. For example, a line having a slope near 1 is fitted. Specifically, a line of which the slope approaches the set value for the slope can be fitted in the similarity matrix using the Random Sample Consensus (RANSAC) method. The RANSAC method is a common method for calculating mathematical model parameters of data according to a group of sample data sets containing abnormal data so as to acquire effective sample data. Thereafter, the process proceeds to steps S64-2c.

And S64-2c, determining a sequence comparison score according to the plurality of unit similarities contained in the second matching straight line to represent the similarity of the query video and the existing video. Specifically, the average value of the unit similarities on the second matching straight line may be determined as the sequence comparison score. In addition, the starting and ending times of the duplicate segments of the two videos can be determined on the basis of the starting and end points of the second matching straight line.

According to the method for determining the duplicate video provided by the invention, by using a constant-speed video method to determine the sequence comparison score and/or the duplicate video segments, the accuracy of duplicate checking and the speed of duplicate checking can be improved.

In some embodiments of the present disclosure (e.g., the previously described embodiments shown in FIGS. 7 and 8), step S64 further comprises: detecting the beginning part and the ending part of the obtained first matching straight line or second matching straight line, determining whether points (unit similarities) at the beginning part and the ending part of the first matching straight line/second matching straight line reach a preset set value for the unit similarity, and removing parts (with low unit similarity) of the beginning part and the ending part of the first matching straight line/second matching straight line which do not reach the set value for the unit similarity, reserving a middle section of the straight line and defining the middle section of straight line as a third matching straight line; and determining the similarity between the query video and the existing video according to the straight line similarity of the third matching straight line, and/or determining the starting and ending times of the duplicate video segments of the query video and the existing video according to the starting point and the end point of the third matching straight line. By removing the parts with low similarity at the beginning and the ending parts of the matching straight line and reserving the straight line with high similarity at the middle section, and then determining the similarity between the query video and the existing video, the accuracy of the duplicate checking can be improved, and the starting and ending times of the duplicate video segment can be obtained more accurately.

The specific method for removing the parts which do not reach the set value for the unit similarity at the beginning/ending part of the matching straight line can be as follows: sequentially checking from the starting point/the end point to the middle of the matching straight line, determining whether the set value for the unit similarity is reached or not, and once the first point reaching the set value for the unit similarity is found, removing a plurality of points from the point to the starting point/the end point.

According to the method for determining the duplicate video disclosed by the invention, by carrying out duplicate video checking with the average value or the minimum value of the similarity of a plurality of video features, the possibilities of mismatching produced by comparing the similarity (such as the similarity matrix, the straight line similarity and the like) obtained by use of a single class of video feature can be reduced or eliminated, and the accuracy of duplicate checking is further improved.

Further, if all of the videos in the video database are performed with sequence comparison and the first ranking, it may affect the efficiency of the duplicate checking. Therefore, before sequence comparison, a plurality of existing videos can be subjected to a second ranking according to each individual first image feature in at least one first video feature so as to select second candidate videos from the video database, and then sequence comparison is carried out on the second candidate videos. In particular, each individual first image feature of the at least one first video feature may be used as an index request to perform term frequency-inverse document frequency ranking (TF-IDF ranking) on a plurality of existing videos.

In some embodiments of the present disclosure, the second video feature may be indexed to obtain a feature index for a plurality of existing videos in advance, and the feature index may then be matched to the first image feature to perform TF-IDF ranking on the plurality of existing videos.

Specifically, the pre-obtained feature index of the existing video further includes a forward feature index and an inverted feature index of the video features of the existing video pre-obtained so as to facilitate the duplicate checking of the video. The forward feature index and inverted feature index may be pre-stored in a video database. The forward feature index is used for recording the video features of each existing video, namely, recording which image features are specifically contained in the video features of each existing video and the sequence of the image features; the inverted feature index is used to record in which video features of the existing video or videos the individual image feature appears. Specifically, the forward and inverted feature index may be stored in the form of a key-value pair: in the forward feature index, a number (alternatively, referred to as a video ID) of a video is represented by a key, and a value corresponding to the key records which image features are contained in the video and the order of the image features, and the key and value in the forward feature index can be referred to as a forward key and a forward value respectively; in the inverted feature index, an image feature is represented by a key, and a value corresponding to the key records the number of the video containing the image feature, and the key and the value in the inverted feature index can be referred to as an inverted key and an inverted value, respectively.

The TF-IDF ranking is a technology for ranking information by weighting the term frequency and the inverse document frequency of the information to judge the importance of the information. The term frequency refers to the frequency of a word (or a message) appearing in an article (or a file), and the higher term frequency indicates that the word is more important to the article; the document frequency refers to how many articles a word appears in within an article library, and the inverse document frequency is the reciprocal of the document frequency (in practical calculation, the reverse document frequency can also be logarithmed, or the inverse document frequency is defined to be the logarithm of the reciprocal of the document frequency), and the higher the reverse document frequency, the better the discrimination of the word. Therefore, the TF-IDF ranking is ranked according to the product of the term frequency and the inverse document frequency. In fact, the video feature of a video can be treated as an article and each image feature as a word so that existing videos can be ranked in use of the TF-IDF approach.

In addition, if the second ranking is performed on all existing videos in the video database, the efficiency of the second ranking may be affected, so that the existing videos in the video database may be performed with exact match before the second ranking. The exact match is used for selecting the existing videos with the number of the included first image features being no less than the preset number or the preset proportion for second ranking.

Figure 9:
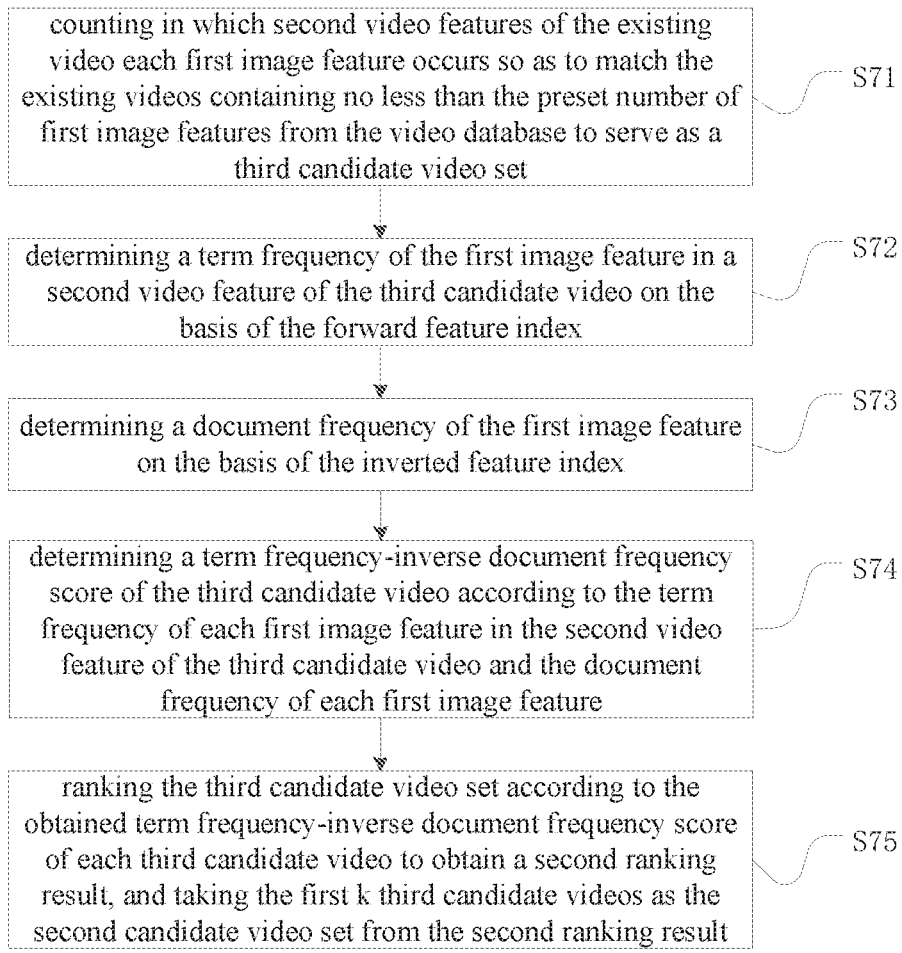
FIG. 9 is a block flow diagram of second ranking provided by one embodiment of the present disclosure.

FIG. 9 is a schematic block flow diagram of the second ranking including an exact match step provided by one embodiment of the present disclosure. Referring to FIG. 9, in one embodiment of the present disclosure, prior to performing step S12, the following steps are performed:

Step S71, counting in which second video features of the existing video each first image feature occurs according to the inverted feature index so as to match the existing videos containing no less than the preset number of first image features from the video database to serve as a third candidate video set. Thereafter, the process proceeds to step S72.

Step S72, determining a term frequency of the first image feature in a second video feature of the third candidate video on the basis of the forward feature index. The term frequency is the proportion of a first image feature among all image features included in a second video feature. Thereafter, the process proceeds to step S73.

Step S73, determining a document frequency of the first image feature on the basis of the inverted feature index. The document frequency is, among the plurality of existing videos (which may be, for example, all existing videos in the video database), the proportion of the number of existing videos containing the first image feature included in the second video feature to the total number of existing videos. Thereafter, the process proceeds to step S74.

Step S74, determining a term frequency-inverse document frequency score of the third candidate video according to the term frequency of each first image feature in the second video feature of the third candidate video and the document frequency of each first image feature. Thereafter, the process proceeds to step S75.

Step S75, ranking the third candidate video set according to the obtained term frequency-inverse document frequency score of each third candidate video to obtain a second ranking result, and taking the first k third candidate videos as the second candidate video set from the second ranking result. Meanwhile, the second video feature (forward feature index) of each second candidate video may also be returned for further processing of the second candidate video set on the basis of the second video feature in a subsequent step S12.

In the embodiment, an index server can be used for taking the set of the first image features of the query video as an index request, performing exact match and TF-IDF ranking according to the forward feature index and the inverted feature index so as to recall the second candidate video set and simultaneously return the obtained forward feature index of each second candidate video. Specifically, the steps described above can be performed in use of an open source Elasticsearch search engine to achieve rapid retrieval.

Notably, exact match and the second ranking focus on which existing videos each individual first image feature appears in, while the effect of the order of each first image feature in the first video feature on the duplicate checking is not taken into consideration, or the overall video feature or the matching of multiple image features arranged in order is not taken into consideration.

Accordingly, steps S12 and S13 in the foregoing example are changed to the following steps: respectively performing the sequence comparison on the plurality of second candidate videos to obtain a sequence comparison result, and performing the first ranking on the plurality of second candidate videos to select the first candidate video from the plurality of second candidate videos according to the first ranking.

According to the method for determining the duplicate video, the accuracy and efficiency of determining the duplicate video can be greatly improved by performing the second ranking.

It should be noted that the process of binarizing image features in the foregoing embodiment may be performed to facilitate the second ranking prior to performing step S71.

Figure 10:
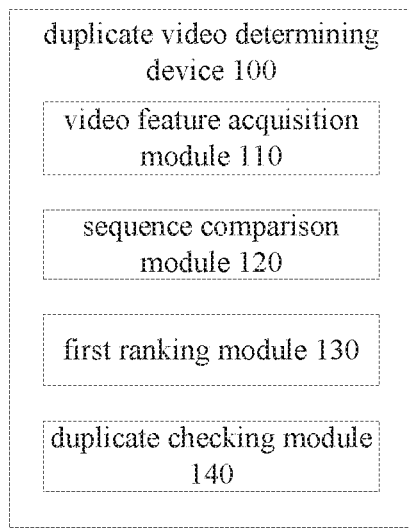
FIG. 10 is a structural block diagram of a determining device for a duplicate video according to one embodiment of the present disclosure.

FIG. 10 is a schematic structural block diagram of one embodiment of the device for determining the duplicate video of the present disclosure. Referring to FIG. 10, the duplicate video determining device 100 according to an example of the present disclosure mainly includes:

a video feature acquisition module 110 configured to acquire multiple types of video features of a query video;

a sequence comparison module 120 configured to respectively performing sequence comparison on a plurality of existing videos according to a plurality of video features of the query video to obtain a sequence comparison result;

a first ranking module 130 configured to perform first ranking on the plurality of existing videos according to the sequence comparison result, and taking first n existing videos in the first ranking result as first candidate videos according to a result of the first ranking, wherein n is a positive integer; and a duplicate checking module 140 configured to determine the duplication level of the query video according to the sequence comparison result of the first candidate video.

Figure 11:
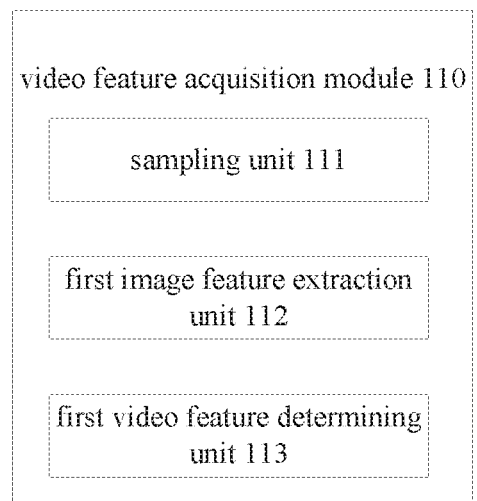
FIG. 11 is a structural block diagram of a video feature acquisition module provided by one embodiment of the present disclosure.

FIG. 11 is a schematic block diagram of the video feature acquisition module 110 provided by one embodiment of the present disclosure. Referring to FIG. 11, the video feature acquisition module 110 according to an example of the present disclosure mainly includes:

a sampling unit 111 configured to sample and extract frames of the query video to obtain a plurality of frame images of the query video;

a first image feature extraction unit 112 configured to extract a plurality of image features of each frame image, and the image features of the query video being defined as a first image feature; and a first video feature determining unit 113 configured to determining the first video feature of the query video according to each first image feature of a same type of the plurality of frame images of the query video, to obtain a plurality of first video features.

In particular, the first image feature extraction unit 112 may include a plurality of sub-units (not shown in the drawings) that extract a fence feature according to the steps in the foregoing method embodiments and/or a plurality of sub-units (not shown in the drawings) that extract a pooling feature according to the steps in the foregoing method embodiments.

Further, the device for determining the duplicate video of the example of the present disclosure may further include a binarization module (not shown in the drawings) for binarizing an image feature using a random projection method.

Figure 12:
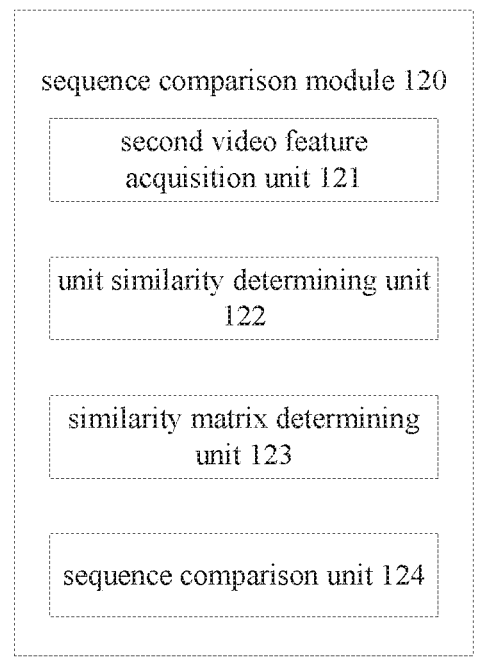
FIG. 12 is a structural block diagram of a sequence comparison module provided by one embodiment of the present disclosure.

FIG. 12 is a schematic block diagram of a sequence comparison module 120 provided by one embodiment of the present disclosure. Referring to FIG. 12, an exemplary sequence comparison module 120 of the present disclosure includes:

a second video feature acquisition unit 121 configured to acquire a plurality of video features of an existing video. A video feature of an existing video may be defined as a second video feature, each second video feature comprising a plurality of second image features;

a unit similarity determining unit 122 configured to respectively determining a unit similarity between each second image feature in each second video feature and each first image feature in the first video feature of a same type to obtain a plurality of unit similarities;

a similarity matrix determining unit 123 configured to determine a similarity matrix of the existing video according to an average value of a plurality of unit similarities; or configured to determine the similarity matrix of the existing video according to a minimum value of the plurality of unit similarities; and a sequence comparison unit 124 configured to determine a similarity of the existing video and the query video according to the similarity matrix. In particular, the sequence comparison unit 124 is used to determine the similarity of the query video and the existing video on the basis of a line in the similarity matrix.

In particular, the sequence comparison unit 124 may include a plurality of sub-units (not shown in the drawings) for determining the sequence comparison score and determining the duplicate video segment using a constant-speed video method in accordance with the foregoing method embodiments, or the sequence comparison unit 124 may include a plurality of sub-units (not shown in the drawings) for determining the sequence comparison score and determining the duplicate video segment using a dynamic programming method.

Further, if all of the videos in the video database are performed with the sequence comparison and the first ranking, it may affect the duplicate checking efficiency. Thus, prior to the sequence comparison module 120, a second ranking module (not shown in the drawings) may be provided for second ranking the plurality of existing videos on the basis of each individual first image feature of at least one first video feature to select a second candidate video from the video database. Further, the sequence comparison module 120 is configured to perform sequence comparison on the second candidate video. Specifically, the second ranking module is configured to: take each individual first image feature in the at least one first video feature as an index request, and rank a plurality of existing videos using the term frequency—inverse document frequency ranking approach.

It should be noted that the binarization module may be disposed prior to the second ranking module to facilitate the second ranking by the second ranking module.

Figure 13:
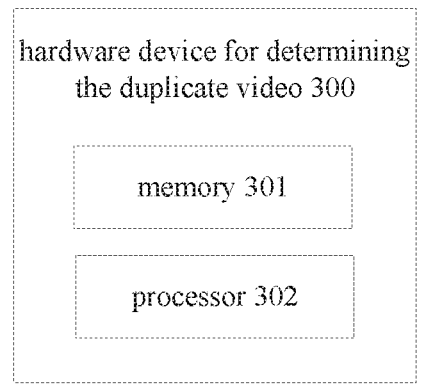
FIG. 13 is a hardware block diagram of a determining hardware device for a duplicate video according to one embodiment of the present disclosure.

FIG. 13 is a hardware block diagram of a hardware device for determining duplicate video according to one embodiment of the present disclosure. As shown in FIG. 13, the hardware device 300 for determining duplicate video according to the embodiment of the present disclosure includes a memory 301 and a processor 302. The components in the hardware device 300 for determining duplicate video are interconnected by a bus system and/or other forms of connection mechanisms (not shown).

The memory 301 is used for storing non-transitory computer-readable instructions. Specifically, the memory 201 may include one or more computer program products, which may include various forms of computer-readable storage media, such as volatile memory and/or non-volatile memory. The volatile memory may include, for example, random access memory (RAM) and/or cache, etc. The nonvolatile memory may include, for example, read only memory (ROM), hard disk, flash memory, etc.

The processor 302 may be a central processing unit (CPU) or other forms of processing unit having data processing capability and/or instruction execution capability, and may control other components in the hardware device 300 for determining duplicate video to perform desired functions. In one embodiment of the present disclosure, the processor 302 is used for executing the computer-readable instructions stored in the memory 301 so that the hardware device 300 for determining duplicate video performs all or part of the steps of the aforementioned method for determining duplicate video according to the embodiments of the present disclosure.

Figure 14:
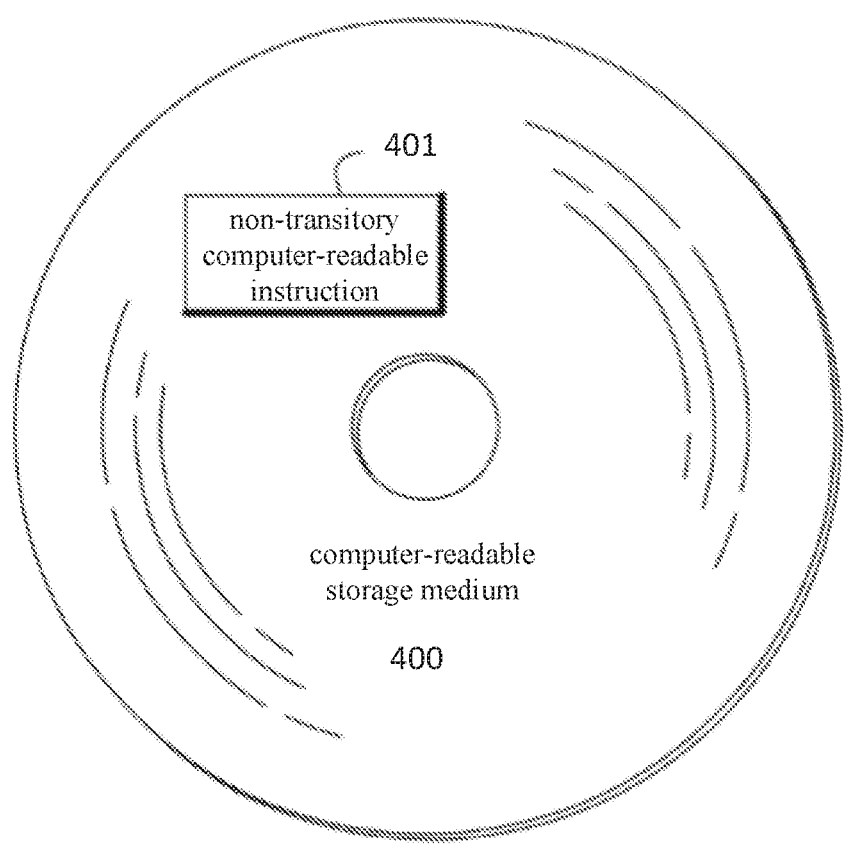
FIG. 14 is a schematic diagram of a computer-readable storage medium according to one embodiment of the present disclosure.

FIG. 14 is a schematic diagram of a computer-readable storage medium according to one embodiment of the present disclosure. As shown in FIG. 14, the computer-readable storage medium 400 according to the embodiment of the present disclosure has non-transitory computer-readable instructions 401 stored thereon. When the non-transitory computer-readable instructions 401 are executed by the processor, all or part of the steps of the aforementioned method for determining duplicate video according to the embodiments of the present disclosure are executed.

Figure 15:
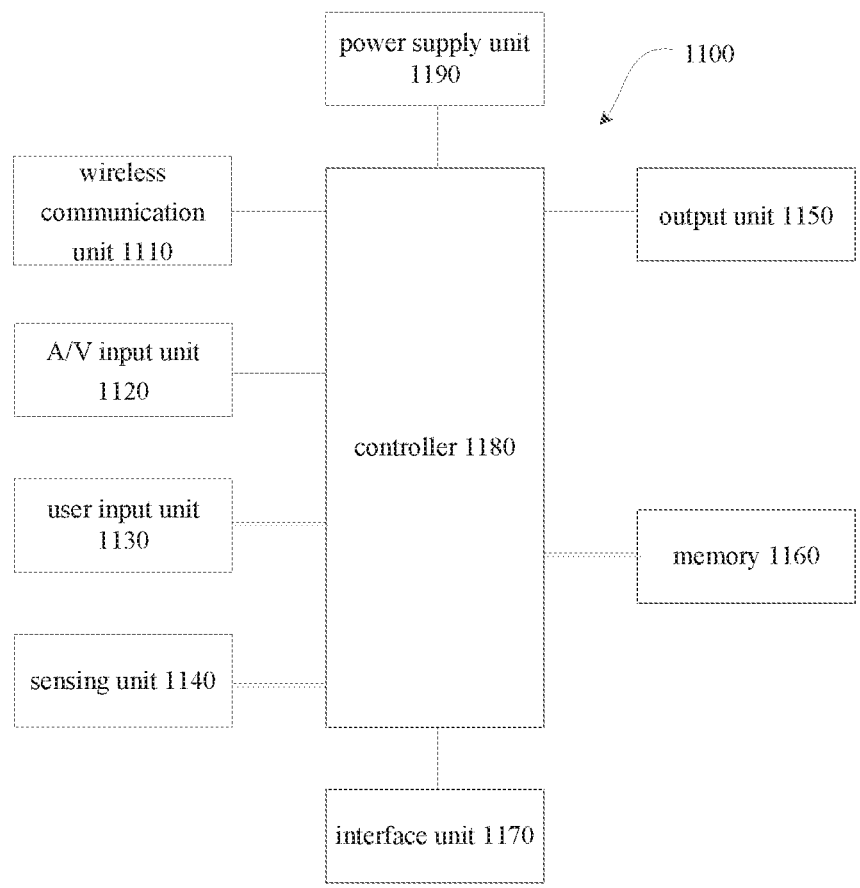
FIG. 15 is a structural block diagram of a terminal device according to one embodiment of the present disclosure.

FIG. 15 is a hardware structure diagram of a terminal device according to one embodiment of the present disclosure. The terminal device may be implemented in various forms, and the terminal device in the present disclosure may include, but is not limited to, mobile terminal device such as mobile phone, smart phone, notebook computer, digital broadcast receiver, personal digital assistant (PDA), PAD, portable multimedia player (PMP), navigation device, vehicle-mounted terminal device, vehicle-mounted display terminal, and vehicle-mounted electronic rearview mirror, and fixed terminal devices such as digital TV and desktop computer.

As shown in FIG. 15, the terminal device 1100 may include a wireless communication unit 1110, an A/V (audio/video) input unit 1120, a user input unit 1130, a sensing unit 1140, an output unit 1150, a memory 1160, an interface unit 1170, a controller 1180, a power supply unit 1190, and the like. FIG. 15 shows a terminal device having various components, but it should be understood that not all of the illustrated components are required to be implemented. More or fewer components may be implemented alternatively.

The wireless communication unit 1110 allows radio communication between the terminal device 1100 and a wireless communication system or network. The A/V input unit 1120 is used for receiving audio or video signals. The user input unit 1130 may generate key input data according to commands input by a user to control various operations of the terminal device. The sensing unit 1140 detects the current state of the terminal device 1100, the position of the terminal device 1100, the presence of touch input of a user to the terminal device 1100, the orientation of the terminal device 1100, and the acceleration or deceleration movement and direction of the terminal device 1100, and generates commands or signals for controlling the operation of the terminal device 1100. The interface unit 1170 serves as an interface through which at least one external device may be connected to the terminal device 1100. The output unit 1150 is configured to provide an output signal in a visual, audio, and/or tactile manner. The memory 1160 may store software programs and the like for processing and controlling operations executed by the controller 1180, or may temporarily store data which have been output or are to be output. The memory 1160 may include at least one type of storage medium. Moreover, the terminal device 1100 may cooperate with a network storage device which performs the storage function of the memory 1160 through network connection. The controller 1180 generally controls the overall operation of the terminal device. In addition, the controller 1180 may include a multimedia module for reproducing or playing back multimedia data. The controller 1180 may perform pattern recognition processing to recognize handwriting input or picture drawing input performed on a touch screen as characters or images. The power supply unit 1190 receives external power or internal power under the control of the controller 1180 and provides appropriate power required to operate various elements and components.

Various embodiments of the method for determining duplicate video provided by the present disclosure may be implemented by a computer-readable medium using, for example, computer software, hardware, or any combination thereof. For hardware implementation, various embodiments of the method for determining duplicate video provided by the present disclosure may be implemented by at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. In some cases, various embodiments of the method for determining duplicate video provided by the present disclosure may be implemented in the controller 1180. For software implementation, various embodiments of the method for determining duplicate video provided by the present disclosure may be implemented with a separate software module which allows at least one function or operation to be performed. A software code may be implemented by a software application program (or program) written in any suitable programming language, and the software code may be stored in the memory 1160 and executed by the controller 1180.

In summary, according to the method, device, hardware device, computer-readable storage medium and terminal device of determining duplicate video provided by the embodiment of the present disclosure, the efficiency, accuracy and robustness of the duplicate video checking can be greatly improved by using multiple types of video features for duplicate video checking.

The basic principles of the present disclosure have been described above in connection with the specific embodiments. However, it should be noted that the advantages, effects, and the like referred to in the present disclosure are merely examples and these advantages, effects, and the like are not considered to be necessary for each embodiments of the present disclosure. In addition, the specific details of the above disclosure are only for the purpose of illustration and convenience of understanding, and are not intended to limit the present disclosure.

The block diagrams of device, device, equipment, and systems referred to in the present disclosure are only illustrative examples and are not intended to require or imply that connections, arrangements, and configurations must be made in the manner shown in the block diagrams. As will be realized by those skilled in the art, these device, device, equipment and systems can be connected, arranged and configured in any way. Terms such as "include", "contain", "have", "comprise", or any other variation are open-ended terms which refer to "including but not limited to" and can be used interchangeably with them. The terms "or" and "and" refer to the terms "and/or" and can be used interchangeably with them, unless the context indicate otherwise. The term "such as" refers to the phrase "such as but not limited to" and can be used interchangeably with it.

In addition, as used herein, "or" used in the enumeration of items starting with "at least one" indicates a separate enumeration, so that, for example, the enumeration of "at least one of A, B or C" means A or B or C, or AB or AC or BC, or ABC (i.e., A and B and C). Furthermore, the phrase "exemplary" does not mean that the described example is preferred or better than other examples.

It should also be noted that in the systems and methods of the present disclosure, various components or steps may be decomposed and/or recombined. These decompositions and/or recombinations should be considered as equivalents to the present disclosure.

Various changes, substitutions, and modifications of the techniques herein may be made without departing from the techniques taught by the appended claims. In addition, the scope of the claims of the present disclosure is not limited to the specific aspects of the above-mentioned processing, machine, manufacturing, composition of the event, means, methods and actions, which can be carried out with basically the same functions or achieve basically the same results as the corresponding aspects described herein. Therefore, the appended claims include the processing, machine, manufacturing, composition of the event, means, methods and actions within their scope.

The above description of the disclosed aspects is provided to enable those skilled in the art to make or use the disclosure. Various modifications to these aspects are apparent to those skilled in the art, and the general principles defined herein may be applied to other aspects without departing from the scope of the present disclosure. Therefore, the present disclosure is not intended to be limited to the aspects shown herein, but in accordance with the widest range consistent with the principles and novel features disclosed herein.

The above description has been given for the purpose of illustration and description. Furthermore, this description is not intended to limit embodiments of the present disclosure to the form disclosed herein. Although a plurality of exemplary aspects and embodiments have been discussed above, those skilled in the art will recognize certain variations, modifications, changes, additions and sub combinations thereof.

The invention claimed is:

1. A method of processing data, comprising:
   acquiring multiple types of video features of a query video;
   performing sequence comparisons for a plurality of existing videos respectively to obtain sequence comparison results according to the multiple types of video features of the query video;
   performing a first ranking on the plurality of existing videos according to the sequence comparison results, and taking first n existing videos as first candidate videos according to a result of the first ranking, where n is a positive integer; and determining a duplication level of the query video according to the sequence comparison results of the first candidate videos;

wherein the acquiring multiple types of video features of a query video further comprises:

extracting frames of the query video to obtain a plurality of frame images of the query video, extracting multiple types of image features of each of the plurality of frame images as first image features, wherein the extracting multiple types of image features of each of the plurality of frame images comprises:

for each of the plurality of frame images, acquiring one or more shift vectors, determining an end point pointed by each shift vector by using each of the one or more shift vectors and taking any pixel in each of the plurality of frame images as a starting point, and determining the multiple types of image features of each of the plurality of frame images according to an overall condition of differences between each starting point and each corresponding end point.

2. The method of claim 1, wherein the acquiring multiple types of video features of a query video further comprises:

determining each video feature of the query video as a first video feature to obtain multiple types of first video features according to each of the first image features with an identical type of the plurality of frame images of the query video.

3. The method of claim 2, wherein the extracting multiple types of image features of each of the plurality of frame images comprises:

for each of the plurality of frame images, performing multiple types of pooling processes step by step to obtain the multiple types of image features of the plurality of frame images as a pooling feature, wherein the multiple types of pooling processes comprise a maximum pooling process, a minimum pooling process and an average pooling process.

4. The method of claim 2, wherein the performing sequence comparisons for a plurality of existing videos respectively to obtain sequence comparison results according to the multiple types of video features of the query video comprises:

acquiring multiple types of video features of one of the plurality of existing videos as second video features, wherein each of the second video features comprises a plurality of second image features;

determining a unit similarity between each of the second image features and each of the first image features of the same type respectively to obtain multiple types of unit similarities;

determining a minimum value or an average value of the multiple types of unit similarities, and determining a similarity matrix of the plurality of existing videos according to the minimum value or the average value of the multiple types of unit similarities; and determining a sequence comparison score according to the similarity matrix, wherein the sequence comparison score is configured for indicating a similarity of the plurality of existing videos and the query video.

5. The method of claim 4, wherein the determining a sequence comparison score according to the similarity matrix comprises:

determining the sequence comparison score according to a straight line in the similarity matrix.

6. The method of claim 4, wherein the performing sequence comparisons for a plurality of existing videos respectively to obtain sequence comparison results according to the multiple types of video features of the query video further comprises:

determining a duplicate video segment of the plurality of existing videos and the query video according to the similarity matrix.

7. The method of claim 2, wherein the performing sequence comparisons for a plurality of existing videos respectively to obtain sequence comparison results according to the multiple types of video features of the query video comprises:

performing a second ranking on the plurality of existing videos according to each of the first image features in at least one of the multiple types of first video features, according to a result of the second ranking, taking first k of the plurality of existing videos as second candidate videos, where k is a positive integer; and performing a sequence comparison for each of the second candidate videos respectively to obtain the sequence comparison result.

8. The method of claim 7, wherein the performing a second ranking on the plurality of existing videos according to each of the first image features in at least one of the multiple types of first video features comprises:

performing a term frequency-inverse document frequency ranking on the plurality of existing videos using each of the first image features in at least one of the multiple types of first video features as an index request.

9. The method of claim 7, wherein the according to each of the first image features with an identical type of the plurality of frame images of the query video, determining each video feature of the query video as a first video feature comprises:

binarizing the first image features; and determining the first video feature according to binarized first image features of the plurality of frame images.

10. A device for determining duplicate video, comprising:
at least one processor; and
at least one memory communicatively coupled to the at least one processor and storing instructions that upon execution by the at least one processor cause the device to:

acquire multiple types of video features of a query video;

perform sequence comparisons for a plurality of existing videos respectively to obtain sequence comparison results according to the multiple types of video features of the query video;

perform a first ranking on the plurality of existing videos according to the sequence comparison results, and take first n existing videos as first candidate videos according to the result of the first ranking, wherein n is a positive integer; and determine the duplication level of the query video according to the sequence comparison results of the first candidate videos;

wherein instructions that upon execution by the at least one processor cause the device to acquire multiple types of video features of a query video further comprise instructions that upon execution by the at least one processor cause the device to:

extract frames of the query video to obtain a plurality of frame images of the query video, extract multiple types of image features of each of the plurality of frame images as first image features, wherein instructions that upon execution by the at least one processor cause the device to extract multiple types of image features of each of the plurality of frame images further comprise instructions that upon execution by the at least one processor cause the device to:
  for each of the plurality of frame images, acquire one or more shift vectors, determine an end point pointed by the shift vector by using each of the one or more shift vectors, and take any pixel in each of the plurality of frame images as a starting point, and
  determine the multiple types of image features of each of the plurality of frame images according to an overall condition of differences between each starting point and each corresponding end point.

11. The device of claim 10, wherein the at least one memory further stores instructions that upon execution by the at least one processor cause the device to:
  determine each video feature of the query video as a first video feature to obtain multiple types of first video features according to each of the first image features with an identical type of the plurality of frame images of the query video.

12. A non-transitory computer-readable storage medium, storing non-transitory computer-readable instructions to perform operations when the non-transitory computer-readable instructions are executed by a computing device, the operations comprising:
  acquiring multiple types of video features of a query video;
  performing sequence comparisons for a plurality of existing videos respectively to obtain sequence comparison results according to the multiple types of video features of the query video;
  performing a first ranking on the plurality of existing videos according to the sequence comparison results, and taking first n existing videos as first candidate videos according to a result of the first ranking, where n is a positive integer; and
  determining a duplication level of the query video according to the sequence comparison results of the first candidate videos;
  wherein the acquiring multiple types of video features of a query video further comprises:
  extracting frames of the query video to obtain a plurality of frame images of the query video,
  extracting multiple types of image features of each of the plurality of frame images as first image features, wherein the extracting multiple types of image features of each of the plurality of frame images comprises:
  for each of the plurality of frame images, acquiring one or more shift vectors, determining an end point pointed by the shift vector by using each of the one or more shift vectors and taking any pixel in each of the plurality of frame images as a starting point, and
  determining the multiple types of image features of each of the plurality of frame images according to an overall condition of differences between each starting point and each corresponding end point.

13. The device of claim 11, wherein the at least one memory further stores instructions that upon execution by the at least one processor cause the device to:
  for each of the plurality of frame images, perform multiple types of pooling processes step by step to obtain the multiple types of image features of the plurality of frame images as a pooling feature, wherein the multiple types of pooling processes comprise a maximum pooling process, a minimum pooling process and an average pooling process.

14. The device of claim 11, wherein the at least one memory further stores instructions that upon execution by the at least one processor cause the device to:
  acquire multiple types of video features of one of the plurality of existing videos as second video features, wherein each of the second video features comprises a plurality of second image features;
  determine a unit similarity between each of the second image features and each of the first image features of the same type respectively to obtain multiple types of unit similarities;
  determine a minimum value or an average value of the multiple types of unit similarities, and determine a similarity matrix of the plurality of existing videos according to the minimum value or the average value of the multiple types of unit similarities; and
  determine a sequence comparison score according to the similarity matrix, wherein the sequence comparison score is configured for indicating a similarity of the plurality of existing videos and the query video.

15. The device of claim 14, wherein the at least one memory further stores instructions that upon execution by the at least one processor cause the device to:
  determine the sequence comparison score according to a straight line in the similarity matrix.

16. The device of claim 14, wherein the at least one memory further stores instructions that upon execution by the at least one processor cause the device to:
  determine a duplicate video segment of the plurality of existing videos and the query video according to the similarity matrix.

17. The device of claim 11, wherein the at least one memory further stores instructions that upon execution by the at least one processor cause the device to:
  perform a second ranking on the plurality of existing videos according to each of the first image features in at least one of the multiple types of first video features, according to a result of the second ranking, take first k of the plurality of existing videos as second candidate videos, where k is a positive integer; and
  perform a sequence comparison for each of the second candidate videos respectively to obtain the sequence comparison result.

18. The device of claim 17, wherein the at least one memory further stores instructions that upon execution by the at least one processor cause the device to:
  perform a term frequency-inverse document frequency ranking on the plurality of existing videos using each of the first image features in at least one of the multiple types of first video features as an index request.

* * * * *